(12) United States Patent
Touma

(10) Patent No.: US 7,283,742 B2
(45) Date of Patent: Oct. 16, 2007

(54) OPTICAL SIGNAL JUDGING SYSTEM AND OPTICAL SIGNAL JUDGING METHOD

(75) Inventor: Eisaku Touma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/024,461

(22) Filed: Dec. 30, 2004

(65) Prior Publication Data
US 2005/0123296 A1 Jun. 9, 2005

Related U.S. Application Data

(63) Continuation of application No. PCT/JP02/09563, filed on Sep. 18, 2002.

(51) Int. Cl.
*H04B 10/00* (2006.01)
(52) U.S. Cl. .......................... 398/19; 398/12
(58) Field of Classification Search ........... 398/45, 398/12, 19
See application file for complete search history.

(56) References Cited

U.S. PATENT DOCUMENTS 6,101,010 A * 8/2000 Konishi .................. 398/14

2001/0046344 A1 11/2001 Hayashi et al.

FOREIGN PATENT DOCUMENTS

| JP | 8-125635 | 5/1996 |
|---|---|---|
| JP | 10-107772 | 4/1998 |
| JP | 11-346202 | 12/1999 |
| JP | 2000-115133 | 4/2000 |
| JP | 2000-354009 | 12/2000 |
| JP | 2002-141867 | 5/2002 |

OTHER PUBLICATIONS

Notice Of Reasons For Rejection dated May 9, 2006 in corresponding Patent Application No. 2004-537507.

* cited by examiner

*Primary Examiner*—Agustin Bello
(74) *Attorney, Agent, or Firm*—Staas & Halsey LLP

(57) ABSTRACT

An optical signal judging system for judging an optical signal outputted from an optical switch the selectively outputs any one of input optical signals, comprises: a converting unit converting at least two optical signals branching off from an optical signal source into optical signals having wavelength bands differing from each other, and thus outputting the optical signals to said optical switch, wherein said optical switch outputs any one of at least the two optical signals so converted as to have the wavelength bands differing from each other, which have been inputted from said converting unit.

4 Claims, 6 Drawing Sheets

OPTICAL SIGNAL JUDGING SYSTEM AND OPTICAL SIGNAL JUDGING METHOD

This application is a continuing application, filed under 35 U.S.C. §111(a), of International Application PCT/JP02/09563 filed Sep. 18, 2002.

TECHNICAL FIELD

The present invention relates to a technology for judging an optical signal outputted from an optical switch that selectively outputs any one of input optical signals.

BACKGROUND ARTS

Over the recent years, there has been utilized a system that executes light wavelength division multiplexing (WDM: Wavelength Division Multiplexing) of 100 or more waves at a transmission speed of 10 Gbps. A wavelength-division-multiplexing transmission is defined as a system for multiplexing and transmitting optical signals having different wavelengths through a single length of optical fiber.

Generally in a communication line, a signal route (including a transmission path, a transmission device and an in-device built-up package) is often given redundancy. There have hitherto been many cases in which a redundant system is built up by electrical processes in a time-division multiplexer (TDM: Time Division Multiplexing), etc. connected to the subordinate of a wavelength division multiplex transmitting device in a network including the wavelength division multiplexing transmission. In the recent years, however, as a multiplexing level of the light wavelength division multiplexer gets extended, there is increasingly a demand for constructing the signal redundant system batchwise at a level of the optical signals.

FIG. 4 shows one example of a system that gains the redundancy of the optical signals on a low-speed side before and after demultiplexing in the network including a wavelength division multiplexing transmission path by a light wavelength division multiplexer (a terminal device) according to the prior art.

This example takes a so-called reception terminal switching configuration, wherein the signals divided by half through a photo coupler C1' in a transmission terminal are inputted respectively to wavelength division multiplexers/demultiplexers A in two systems, etc., and one of reception outputs in the two systems is selected by an optical switch unit 400' on the receiving side and sent to a subordinate device. In FIG. 4, a transponder 111' (211') is a transponder that converts the normal optical signal inputted from the subordinate device into an optical signal having a wavelength based on ITU-T (International Telecommunication Union-Telecommunication Standardization Sector) grid, etc. applied to the wavelength division multiplexing. The signal converted by the transponder 111' is, after being wavelength-division-multiplexed by a multiplexing unit 112' (212'), amplified at a level suited to the optical transmission by an optical amplifier 113' (213') and sent to a transmission path #1 (#2). The optical signal passing through the transmission path is, after its decreased optical level has been compensated by a reception optical amplifier 121' (221'), wavelength-demultiplexed by a wavelength demultiplexing unit 122' (222'). The wavelength-demultiplexed signal is sent to a transponder 123' (223'). The transponder 123' (223') is a transponder including an OE (Optical-Electrical (photoelectric) converting unit) having a durability against an ASE (Amplified Spontaneous Emission) noise in the output of the optical amplifier, and the input optical signal is converted into a signal having a normal optical output specified wavelength that is on the order of STM-1 (x=1 to 64), etc. and also power, and is then optically outputted.

FIG. 5 is a detailed view of the reception side including a switch 401' that performs light receiving terminal switching based on the prior art that is omitted in FIG. 4. The transponder 123' (223') monitors input cut-off detection, out-of-frame detection and error performance by B1 monitoring. The switch unit 400' conducts the input cut-off detection. For example, it is assumed that a 0-system is defined as an active system, while a 1-system is defined as a standby system, and the switch unit 400' is to select the input from the 0-system. In an initial state, both of the 0- and 1-systems are in a state where there are none of the optical input cut-off, the out-of-frame and the occurrence of error in the switch unit 400' as well as in the transponder 123' (223'). If there occurs from this state a switching trigger (the optical input cut-off, the out-of-frame and an excess of an error threshold value in the transponder 123' (223'), and the optical input cut-off in the switch unit 400') in the active system, a control unit 407' of the switch unit 400' receiving this information switches over the switch selection to the standby system on condition that there is not any alarming state (the optical input cut-off, the out-of-frame and the excess of the error threshold value, and the optical input cut-off in the SW unit) in the standby system. The switch selection is switched over to the 1-system as the standby system, and a G-light output of the switch unit 400' becomes an output in the 1-system. Then, a signal transfer down to the subordinate device is recovered after detecting the switching trigger and a delay of the switch control.

The systems exemplified in the prior art involve using optical switch devices for signal switch units. This switch device system is exemplified such as a system of mechanically switching over an optical path, a system of switching over the optical path with a photomagnetic effect (Kerr effect, etc.), and so on. These types of switches generally have no monitor function capable of checking an operation state by feedback, and therefore, if using this switch for switching of the optical signal, it is impossible to, though capable of grasping a try-to-control-state, acquire information showing which side of system is actually selected. In a transmission system having a redundant system, the grasp of the present selection system is indispensable for a trouble shifting operation on the transmission path. It is, however, impossible to grasp the final system selection due to a characteristic of the optical switch 401' described above, and this is a serious problem in terms of administering the network. As shown in FIG. 6, supposing that a fault occurs in the optical switch 401', in spite of the control unit 407' trying to get the optical signal from the 0-system outputted, the optical signal from the 1-system is actually outputted, in which case an unexpected disconnection of the line might be induced if conducting the trouble shifting operation about the 1-system.

A path monitoring device disclosed in, e.g., Japanese Patent Application Laid-Open Publication No. 10-107772 is proposed as a technology related to the fault monitoring function involving a monitor of the wavelength division multiplexing light. According to this path monitoring device, monitoring of abnormality of a multiplexer or a switch is actualized by the monitor of the wavelength division multiplexing light. Further, a monitor control device disclosed in, e.g., Japanese Patent Application Laid-Open Publication No. 11-346202 is proposed as a similar technology. According to this monitor control device, the monitoring of the abnormality of the multiplexer is actualized by the monitor of the wavelength division multiplexing light.

DISCLOSURE OF THE INVENTION

It is an object of the present invention to make it possible to judge an optical signal actually outputted from an optical switch that selectively outputs any one of input optical signals.

The present invention was devised to solve the problems given above and is constructed as follows. An optical signal judging system for judging an optical signal outputted from an optical switch that selectively outputs any one of input optical signals, comprises a converting unit converting at least two optical signals branching off from an optical signal source into optical signals having wavelength bands differing from each other, and thus outputting the optical signals to the optical switch, wherein the optical switch outputs any one of at least the two optical signals so converted as to have the wavelength bands differing from each other, which have been inputted from the converting unit.

According to the present invention, the optical switch outputs any one of at least the two optical signals in the input optical signals (it may be said that each input optical signal attached with a label) so converted as to have the wavelength bands which differ from each other, and hence it is possible to judge the optical signal actually outputted from the optical switch on the basis of the wavelength band of the optical signal outputted.

The optical signal judging system further comprises, for example, a judging unit judging the wavelength band of the optical signal outputted from the optical switch. With this construction, it is possible to automatically judge the wavelength band of the optical signal actually outputted from the optical switch.

In the optical signal judging system, the judging unit includes a filter transmitting the optical signal having a specified wavelength band, and a light receiving unit receiving via the filter the optical signal having the specified wavelength band, which is outputted from the optical switch. Further, in the optical signal judging system, for instance, the judging unit includes, for every wavelength band given when converted by the converting unit, a filter transmitting the optical signal having this wavelength band, and a light receiving unit receiving via the filter the optical signal having this wavelength band, which is outputted from the optical switch.

When thus contrived, it is feasible to judge the wavelength band of the optical signal actually outputted from the optical switch with a comparatively simple construction.

Moreover, the optical signal judging system further comprising, for example, a control unit performing switching-control of the optical switch for a purpose of getting any one of the input optical signals outputted, and a detecting unit detecting abnormality of the optical switch if the wavelength band of the input optical signal to be outputted under the switching-control over the optical switch by the control unit differs from the wavelength band of the optical signal judged by the judging unit.

When this contrivance, it is possible to detect the abnormality of the optical switch with a comparatively simple construction.

Still further, the present invention can be specified as below. An optical signal judging system for judging an optical signal outputted from an optical switch that selectively outputs any one of input optical signals, comprises a first processing unit executing a predetermined process upon one optical signal of at least two optical signals branching off from an optical signal source, a second processing unit executing the same process as the predetermined process upon the other optical signal of at least the two optical signals branching off the optical signal source, and a converting unit converting at least the two optical signals inputted respectively from the first and second processing units into optical signals having wavelength bands differing from each other, and thus outputting the optical signals to the optical switch, wherein the optical switch outputs any one of at least the two optical signals so converted as to have the wavelength bands differing from each other, which have been inputted from the converting unit.

According to the present invention, the optical switch outputs any one of at least the two optical signals in the input optical signals (it may be said that each input optical signal attached with a label) so converted as to have the wavelength bands which differ from each other, and it is therefore possible to judge the optical signal actually outputted from the optical switch on the basis of the wavelength band of the optical signal outputted.

Yet further, the present invention can be specified by way of the invention of a method as follows. An optical signal judging method for judging an optical signal outputted from an optical switch that selectively outputs any one of input optical signals, comprises converting at least two optical signals branching off from an optical signal source into optical signals having wavelength bands differing from each other, and thus outputting the optical signals to the optical switch, wherein the optical switch outputs any one of at least the two optical signals so converted as to have the wavelength bands differing from each other.

Moreover, the present invention can be specified by way of the invention of a method as below. An optical signal judging method for judging an optical signal outputted from an optical switch that selectively outputs any one of input optical signals, comprises converting, into optical signals having wavelength bands differing from each other and thus outputting the optical signals to the optical switch, at least two optical signals inputted respectively from a first processing unit executing a predetermined process upon one optical signal of at least the two optical signals branching off from an optical signal source and from a second processing unit executing the same process as the predetermined process upon the other optical signal of at least the two optical signals branching off the optical signal source, wherein the optical switch outputs any one of at least the two optical signals so converted as to have the wavelength bands differing from each other.

BEST MODE FOR CARRYING OUT THE INVENTION

An outline of system architecture of an optical signal judging system will hereinafter be described by way of one embodiment of the invention with reference to the drawings.

Figure 1:
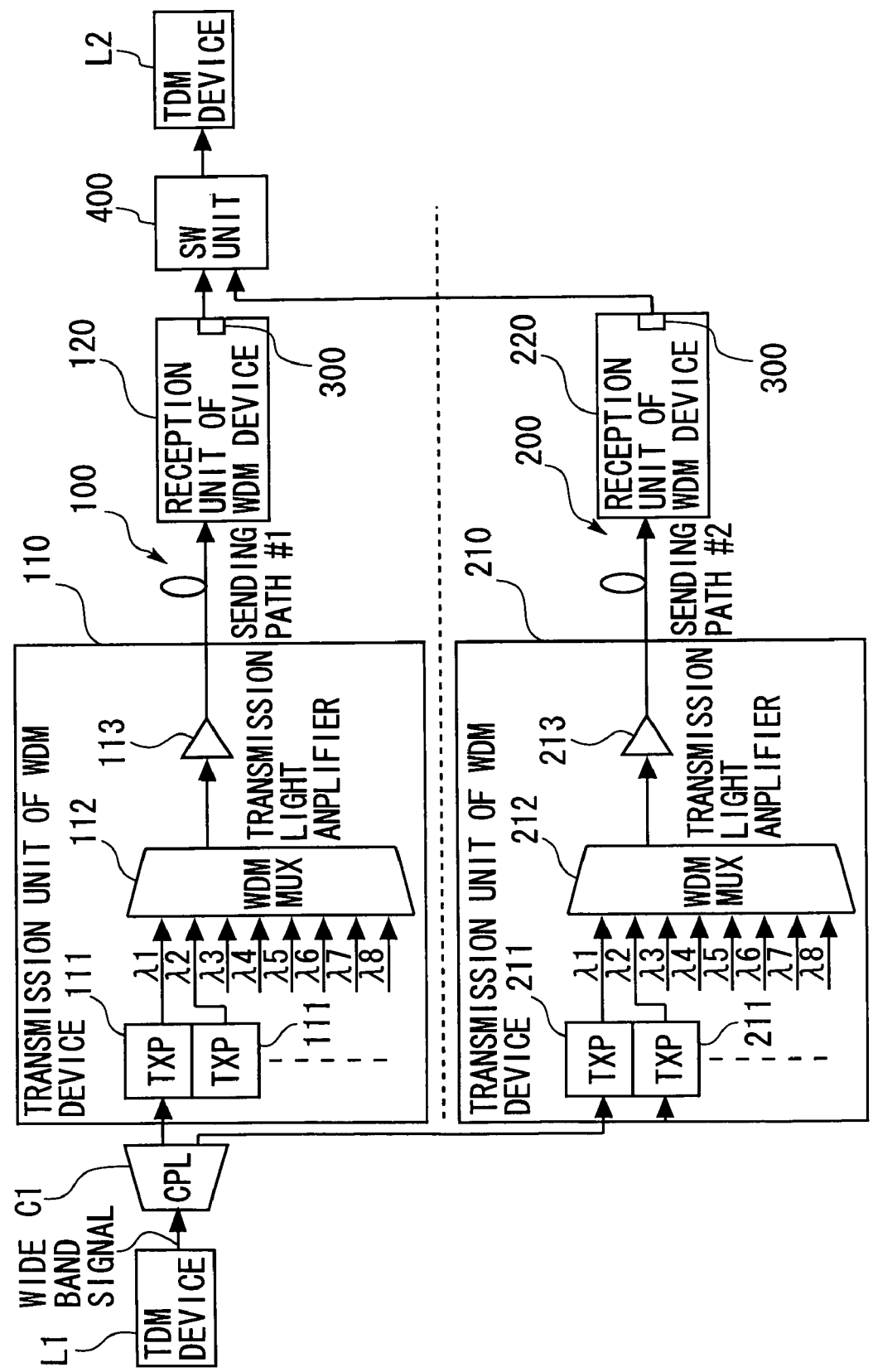
FIG. 1 is a diagram of an outline of a system architecture of an optical signal judging system as an embodiment of the present invention.

FIG. 1 is a diagram of the outline of the system architecture of the optical signal judging system. As shown in FIG. 1, the optical signal judging system includes a switch unit 400 to which two optical signals branching off at a photo coupler C1 from a TDM device L1 serving as an optical signal source are inputted via a first processing unit 100, a second processing unit 200 and a converting unit 300. The first and second processing units 100, 200 are each constructed in redundancy to execute the same processing upon the input optical signals, and are disposed in parallel. The converting unit 300 converts the two input optical signals into optical signals having wavelength bands which differ from each other. In this optical signal judging system, the two optical signals branching off at the photo coupler from the TDM device L1 are respectively subjected to the same processing by the first and second processing units 100, 200 and are further, after being so converted by the converting unit 300 as to have the wavelength bands which differ from each other, inputted to the switch unit 400. The switch unit 400 selectively outputs any one of these input optical signals. It should be noted that the optical signals branching off from the TDM device L1 are two signals, and hence the two processing units 100, 200 are provided corresponding thereto in the present embodiment, however, a proper number of processing units can be provided corresponding to the number of optical signals branching off.

The first processing unit 100 includes a WDM device transmitting unit 110 and a WDM device receiving unit 120 connected via a transmission path #1 to the WDM device transmitting unit 110.

The WDM device transmitting unit 110 has a transponder 111 connected via the photo coupler C1 to the TDM device L1. The transponder 111 is a device for converting one optical signal (a normal optical signal) of the two optical signals branching off at the photo coupler C1 from the TDM device L1 into an optical signal having a wavelength based on ITU-T (International Telecommunication Union-Telecommunication Standardization Sector) grid, etc. that is applied to wavelength division multiplexing, and thus outputting the converted optical signal. A multiplexing unit 112 connected to this transponder 111 is a device for wavelength-division-multiplexing the post-conversion optical signal inputted from the transponder 111 and thus outputting the multiplexed optical signal. An optical amplifier 113 connected to the multiplexing unit 112 is an amplifier for amplifying the wavelength-division-multiplexed optical signal inputted from the multiplexing unit 112 at a level suited to an optical transmission. The WDM device receiving unit 120 is connected via the transmission path #1 to the optical amplifier 113. The optical signal amplified by the optical amplifier 113 is transmitted to the WDM device receiving unit 120 via the transmission path #1.

Figure 2:
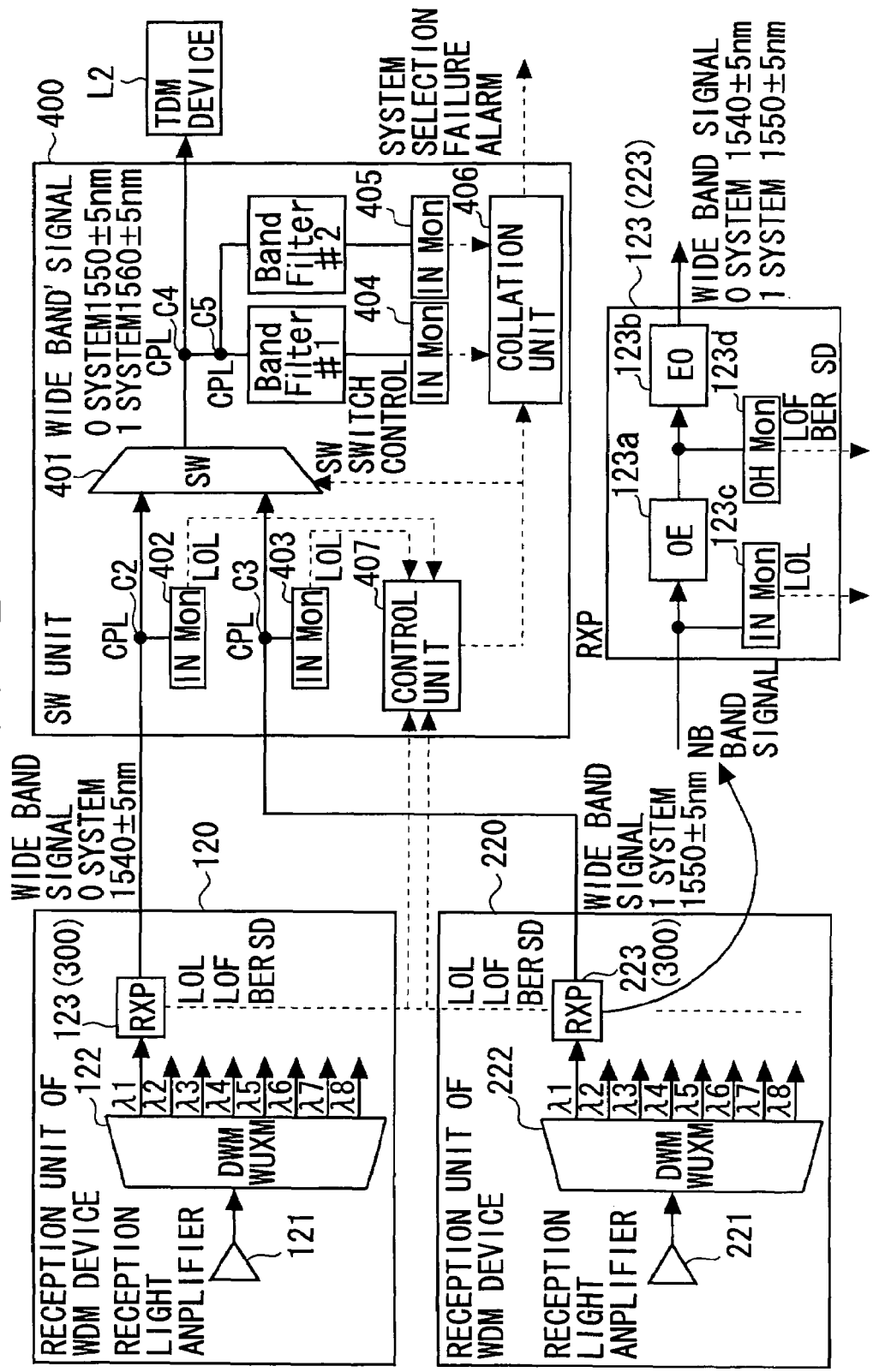
FIG. 2 is an explanatory diagram showing details of a WDM device receiving unit and a switch unit that are included in the optical signal judging system as the embodiment of the present invention.

The WDM device receiving unit 120 includes, as shown in FIG. 2, an optical amplifier 121 connected via the transmission path #1 to the WDM device transmitting device 110. The optical amplifier 121 is an amplifier for amplifying a decreased optical level of the wavelength-division-multiplexed optical signal supplied via the transmission path #1 from the WDM device transmitting unit 110. A wavelength demultiplexing unit 122 connected to this optical amplifier 121 is a device for wavelength-demultiplexing the wavelength-division-multiplexed optical signal inputted from the optical amplifier 121 and thus outputting the demultiplexed optical signal.

The thus-constructed first processing unit 100 executes the predetermined processing (the wavelength-division-multiplexing, wavelength-demultiplexing and so on) upon one optical signal of the two optical signals branching off at the photo coupler C1 from the TDM device L1, and outputs this optical signal to the converting unit 300 (a transponder 123).

The second processing unit 200 includes a WDM device transmitting unit 120 and a WDM device receiving unit 220 connected via a transmission path #2 to the WDM device transmitting unit 210.

The WDM device transmitting unit 210 has a transponder 211 connected via the photo coupler C1 to the TDM device L1. The transponder 211 is a device for converting the other optical signal (a normal optical signal) of the two optical signals branching off at the photo coupler C1 from the TDM device L1 into an optical signal having a wavelength based on ITU-T (International Telecommunication Union-Telecommunication Standardization Sector) grid, etc. that is applied to wavelength-division-multiplexing, and thus outputting the converted optical signal. A multiplexing unit 212 connected to this transponder 211 is a device for wavelength-division-multiplexing the post-conversion optical signal inputted from the transponder 211 and thus outputting the multiplexed optical signal. An optical amplifier 213 connected to the multiplexing unit 212 is an amplifier for amplifying the wavelength-division-multiplexed optical signal inputted from the multiplexing unit 212 at a level suited to the optical transmission. The WDM device receiving unit 220 is connected via the transmission path #2 to the optical amplifier 213. The optical signal amplified by the optical amplifier 213 is transmitted to the WDM device receiving unit 220 via the transmission path #2.

The WDM device receiving unit 220 includes, as shown in FIG. 2, an optical amplifier 221 connected via the transmission path #2 to the WDM device transmitting device 210. The optical amplifier 221 is an amplifier for amplifying a decreased optical level of the wavelength-division-multiplexed optical signal supplied via the transmission path #2 from the WDM device transmitting unit 210. A wavelength demultiplexing unit 222 connected to this optical amplifier 221 is a device for wavelength-demultiplexing the wavelength-division-multiplexed optical signal inputted from the optical amplifier 221 and thus outputting the demultiplexed optical signal.

The thus-constructed second processing unit 200 executes the same processing (the wavelength-division-multiplexing, wavelength-demultiplexing and so on) as the first processing unit 100 does upon the other optical signal of the two optical signals branching off at the photo coupler C1 from the TDM device L1, and outputs this optical signal to the converting unit 300 (a transponder 223).

The converting units 300 connected respectively to the first and second processing units 100, 200 are devices for converting the two optical signals inputted respectively from the first and second processing units 100, 200 into optical signals having wavelength bands which differ from each other. The converting units 300 involve using the two transponders 123, 233 in the present embodiment.

The transponder 123 connected to the first processing unit 100 is a transponder including an OE (Optical-Electrical (photoelectric) converting unit) having durability against an ASE (Amplified Spontaneous Emission) noise of the optical signal inputted from the first processing unit 100. The transponder 123 converts the input optical signal into a signal having a normal optical output specified wavelength that is on the order of STM-1 (x=1 to 64), etc. and power, and effects the optical output of the signal. Herein, the transponder 123 converts the input optical signal into the optical signal having a wavelength band that is on the order of 1540±5 nm and performs the optical output thereof.

The transponder 223 connected to the second processing unit 200 is a transponder including the OE (Optical-Electrical (photoelectric) converting unit) having the durability against the ASE (Amplified Spontaneous Emission) noise of the optical signal inputted from the second processing unit 200. The transponder 223 converts the input optical signal into the signal having the normal optical output specified wavelength that is on the order of STM-1 (x=1 to 64), etc. and the power, and effects the optical output of the signal. Herein, the transponder 223 converts the input optical signal into the optical signal having a wavelength band that is on the order of 1550±5 nm and performs the optical output thereof.

A specific configuration of the transponder 123 (similarly of the transponder 223) is illustrated in a lower right part in FIG. 2. The transponder 123 illustrated therein has a photo-electric converting unit 123*a* connected to the wavelength demultiplexing unit 122. The photo-electric converting unit 123*a* serves to receive the wavelength-demultiplexed optical signal inputted from the wavelength demultiplexing unit 122 and to convert this optical signal into an electric signal. A converting unit 123*b* connected to this photoelectric converting unit 123*a* serves to convert the electric signal inputted from the photoelectric converting unit 123*a* into an optical signal having a specified wavelength band (e.g., 1540±5 nm) and to execute the optical output thereof.

Further, the transponder 123 (223) monitors an input cut-off detection LOL, an out-of-frame detection LOF and error performance BER by B1 monitoring. The switch unit 400 likewise conducts the input cut-off detection LOL.

The thus-constructed converting unit 300 converts the two optical signals inputted respectively from the first and second processing units 100, 200 into the optical signals having the wavelength bands which differ from each other, and thus outputs the optical signals to the switch unit 400. It should be noted that the wavelength band given above for the conversion by the converting unit 300 is one example, however, if the converting unit 300 effects converting within the wavelengths based on the STM-xx standards, it follows that connectivity with the device connecting to the subordinate is ensured.

The switch unit 400 includes a control unit 407 that controls the operation thereof. Connected to the control unit 407 are the transponders 123, 223 serving as the converting units 300 and optical input monitors 402, 403.

The control unit 407 obtains, from the transponders 123, 223 and from the optical input monitors 402, 403, the elements (the input cut-off detection LOL, the out-of-frame detection LOF, and the error performance BER by B1 monitoring) for judging operation states, etc. of the first and second processing units 100, 200, a transmission state of the optical signal and so forth. The control unit 407 detects the states, etc., of the processing units 100, 200 on the basis of these elements obtained. Then, the control unit 407 executes switching-control of the optical switch 401 for the purpose of getting any one of the input optical signals outputted. For example, the control unit 407, if detecting abnormality of any one processing unit 100 (or 200), while making it a condition that the other processing unit 200 (or 100) be normal, performs the switching-control of the optical switch 401 for the purpose of outputting the optical signal inputted from the normal processing unit 200 (or 100).

The optical input monitor 402 includes a photoelectric converting device such as a photodiode, etc. for receiving and converting the optical signal branching off at an optical coupler C2 from the transponder 123 into an electric signal. The optical input monitor 403 includes the photoelectric converting device such as the photodiode, etc. for receiving and converting the optical signal branching off at an optical coupler C3 from the transponder 223 into an electric signal.

The optical switch 401 connected to the control unit 407 is an optical switch that selectively outputs any one of the two optical signals inputted from the transponders 123, 223 serving as the converting units 300 and converted into the signals having the wavelength bands which differ from each other. The optical switch 401 is switching-controlled by the control unit 407 as described above. The optical switch 401 is exemplified by a switching device of such a type as to mechanically switch over an optical path, a switching device of such a type as to switch over the optical path with a photomagnetic effect (Kerr effect, etc.), and so on.

A collation (checking) unit 406 is connected also to the control unit 407. The control unit 407 supplies the collation unit 406 with information indicating a result of the control over the optical switch 401. Optical input monitors 404, 405 are connected to the collation unit 406. The collation unit 406 judges the wavelength band of the optical signal actually outputted from the optical switch 401 on the basis of the photoelectrically-converted electric signal inputted from each of the optical input monitors 404, 405. Specifically, the judgment is made as follows. The optical input monitor 404 includes the photoelectric converting device such as the photodiode, etc for receiving via a band-pass filter #1 the optical signals branching off the photo couplers C4, C5 from the optical switch 401 and converting this optical signal into the electric signal. The optical input monitor 405 includes the photoelectric converting device such as the photodiode, etc for receiving via a band-pass filter #2 the optical signals branching off the photo couplers C4, C5 from the optical switch 401 and converting this optical signal into the electric signal.

Figure 3:
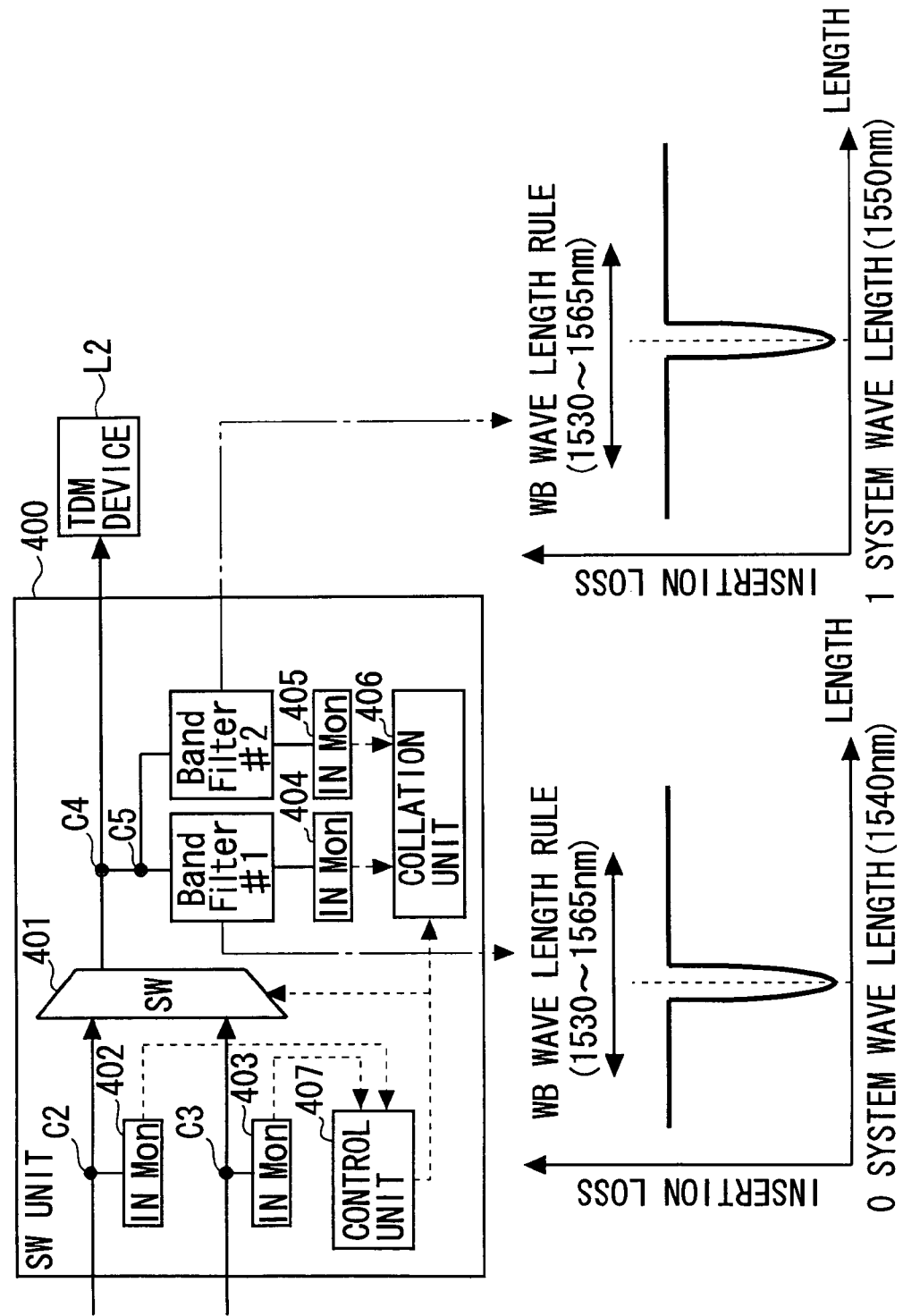
FIG. 3 is an explanatory diagram showing characteristics of a band-pass filter used particularly in the switch unit included in the optical signal judging system as the embodiment of the present invention.
Figure 4:
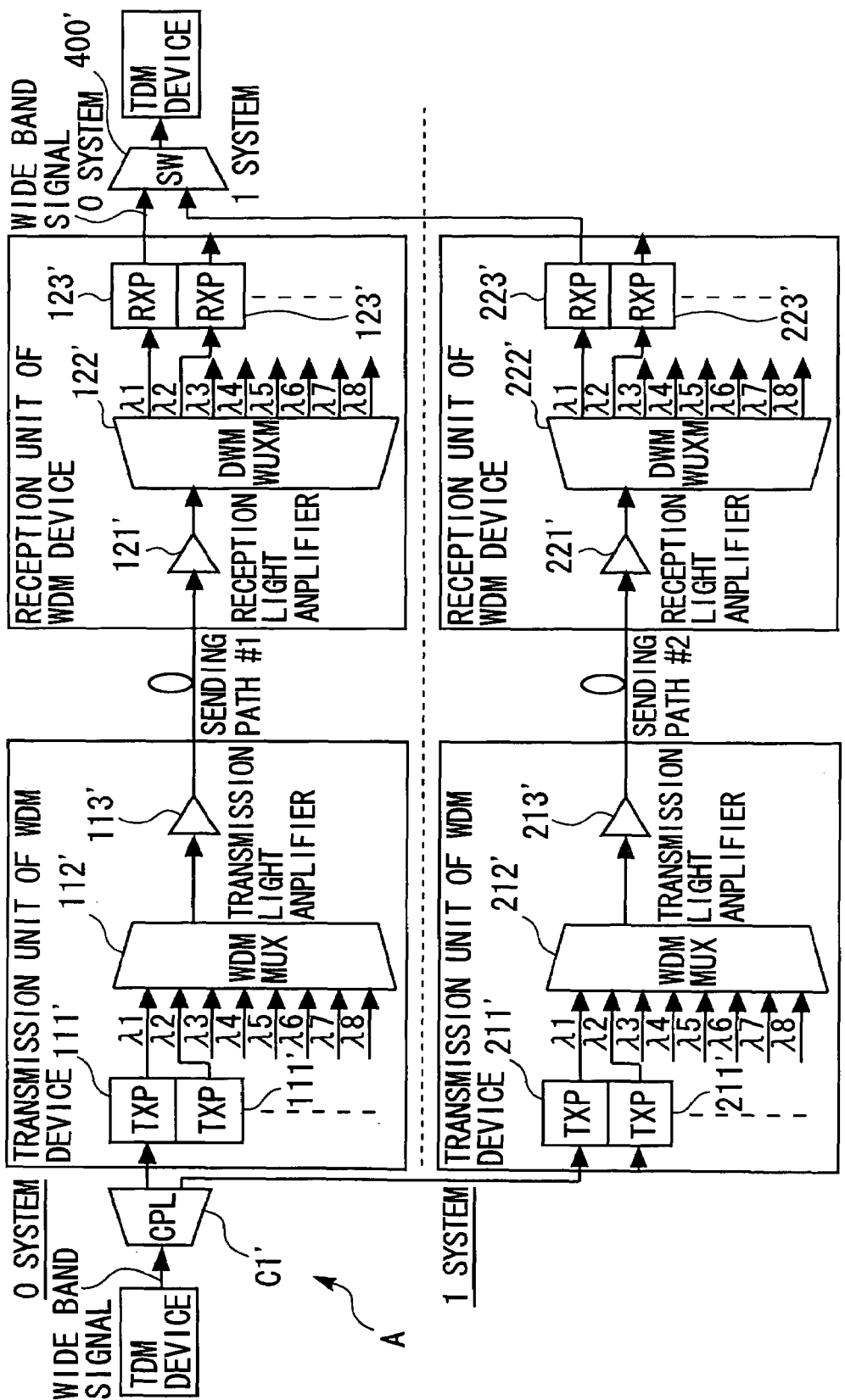
FIG. 4 is an explanatory diagram of an outline of a system architecture in a conventional example in the present invention.
Figure 5:
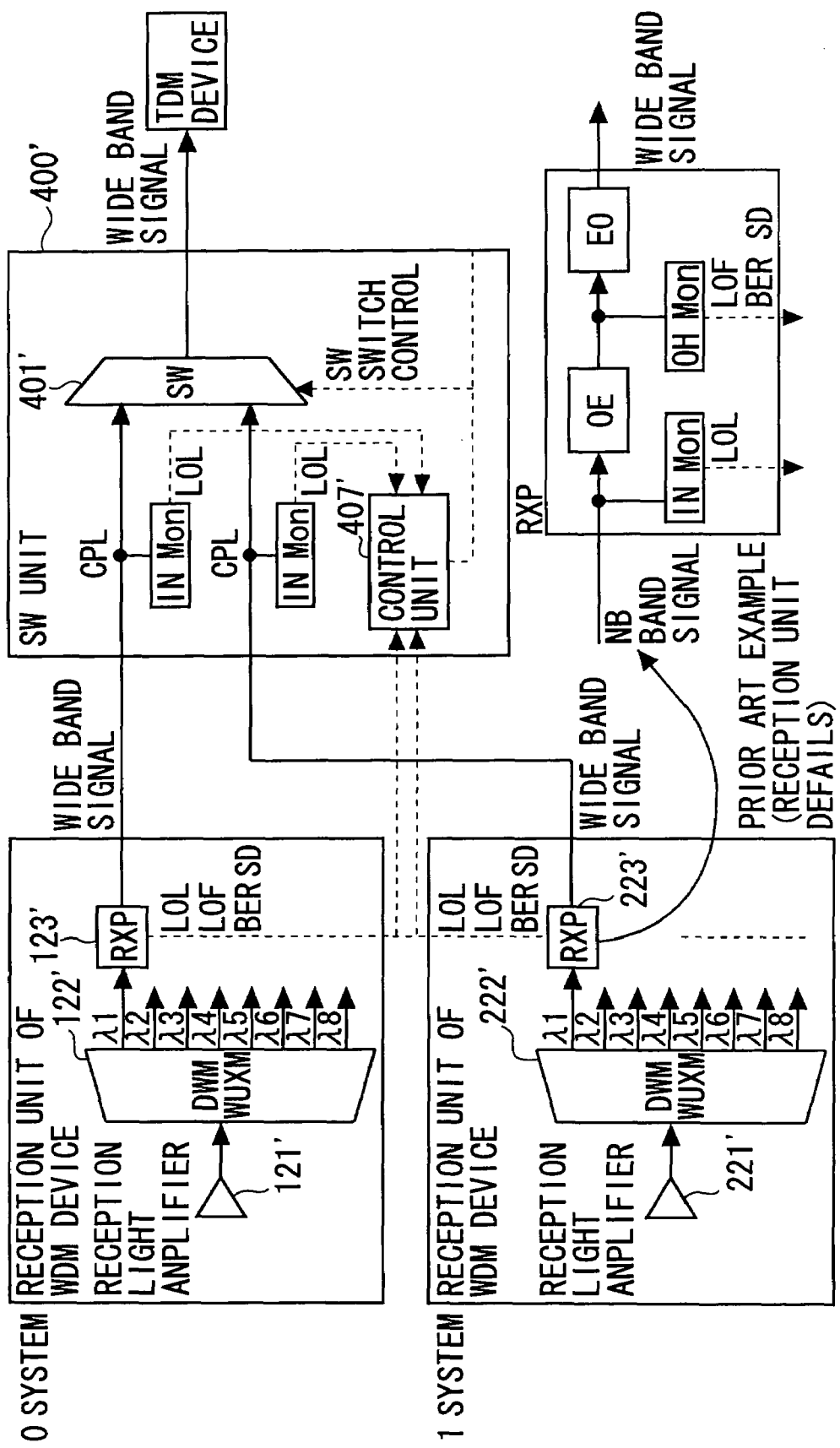
FIG. 5 is an explanatory diagram showing details of a WDM device receiving unit and a switch unit that are included in the conventional example in the present invention.
Figure 6:
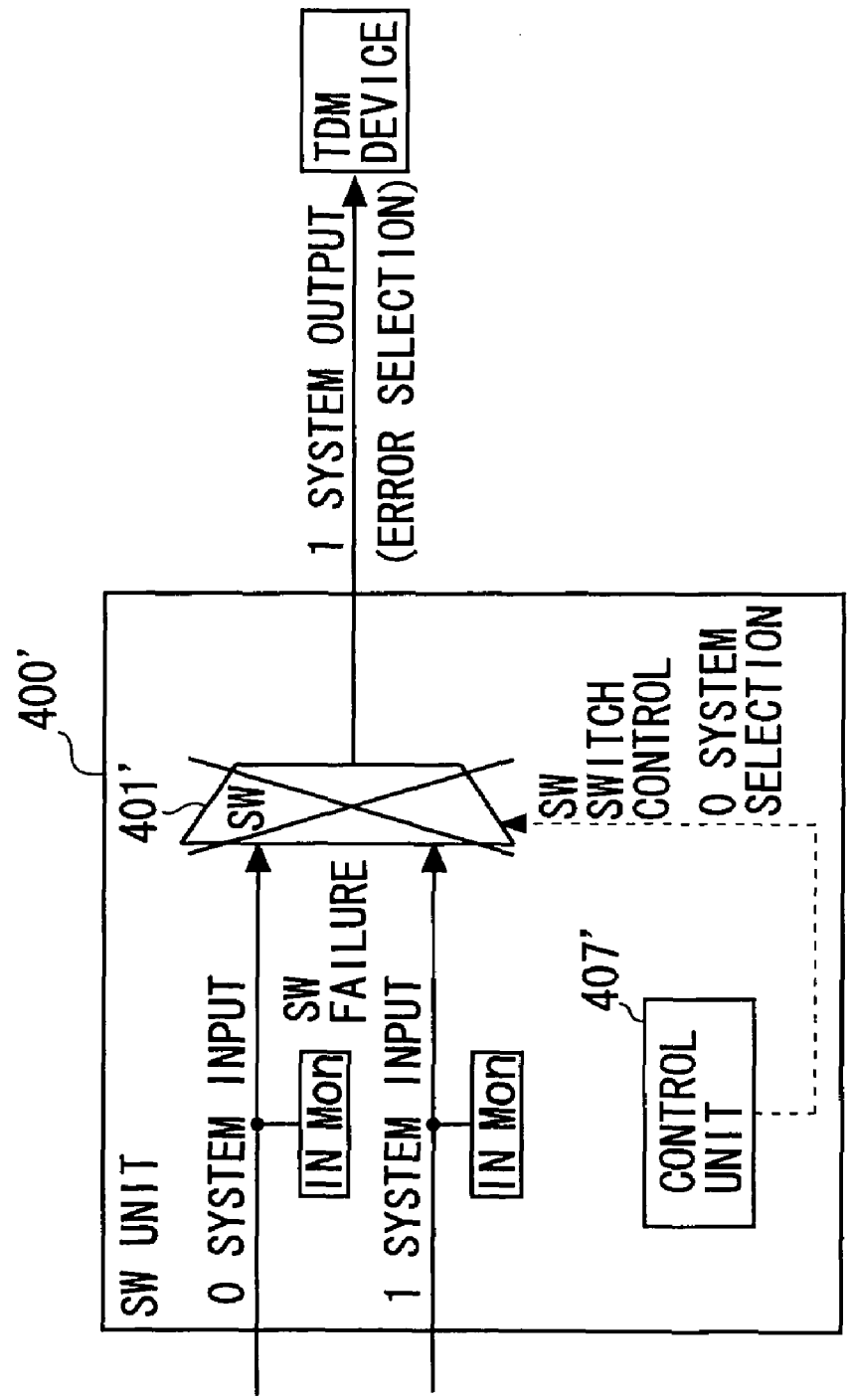
FIG. 6 is an explanatory diagram showing details of the WDM device receiving unit and the switch unit that are included in the conventional example in the present invention.

Characteristics of the band-pass filters #1, #2 are respectively set as shown in FIG. 3. The band-pass filter #1 has the characteristic of transmitting the optical signal (outputted from the transponder 123) having a wavelength band of 1540±5 nm, while the band-pass filter #2 has the characteristic of transmitting the optical signal (outputted from the transponder 223) having a wavelength band of 1550±5 nm but being non-transmissive to wavelengths other than this wavelength (1540±5 nm).

As the band-pass filters #1, #2 have the characteristics given above, when the optical signal having the wavelength band on the order of 1540±5 nm is outputted from the optical switch 401, the optical signal penetrates (passes through) the band-pass filter #1 and reaches the optical input monitor 404. This optical signal does not, however, penetrate the band-pass filter #2 and does not therefore arrive at the optical input monitor 405. While on the other hand, when the optical signal having the wavelength band on the order of 1550±5 nm is outputted from the optical switch 401, the optical signal neither penetrates the band-pass filter #1 nor therefore reaches the optical input monitor 404. This optical signal, however, penetrates the band-pass filter #2 and therefore arrives at the optical input monitor 405.

Accordingly, the collation (checking) unit 406 can judge, based on the photoelectrically-converted electric signal inputted from each of the optical input monitors 404, 405, which wavelength band the optical signal actually outputted from the optical switch 401 has. Thus, the switch unit 400 is provided with the optical input level monitors 404, 405 to which the band-pass filters #1 and #2 corresponding to the respective system wavelengths of the optical signals after being selected through the optical switch device 401 are inserted anterior, whereby the final system selection can be monitored depending on the optical input states of the respective wavelengths.

The collation unit 406 compares information representing a result of the control over the optical switch 401 that is supplied from the control unit 407 described above with a result of the judgment. For example, the collation unit 406 compares the wavelength band of the input optical signal that the control unit 407 tried to output under the switching-control of the optical switch 401 with the wavelength band of the judged optical signal.

As a result of this comparison, the collation unit 406, if these two wavelength bands differ from each other, detects the abnormality of the optical switch 401 and notifies of this purport. Whereas if these two wavelength bands are coincident with each other, the collation unit 406 judges that the optical switch 401 is normal and therefore notifies of nothing particular.

Next, an operation of the optical signal judging system having the configuration described above will be explained with reference to the drawings.

It is assumed that the optical switch 401 is initially switching-controlled to output the optical signal inputted via the first processing unit 100 (and the transponder 123) from the TDM device L1.

As shown in FIG. 1, one optical signal of the two optical signals branching off at the photo coupler C1 from the TDM device L1 is inputted to the first processing unit 100, while the other optical signal is inputted to the second processing unit 200.

Each of the first and second processing units 100, 200 executes the same processing (the wavelength-division-multiplexing, the wavelength demultiplexing, etc.) upon the input optical signal from the TDM device L1. The converting units 300 (the transponders 123, 223) convert the two optical signals inputted respectively from the first and second processing units 100, 200 and subjected to the same processing, into the optical signals having the wavelength bands which differ from each other. In the present embodiment, the optical signal inputted from the first processing unit 100 is converted by the transponder 123 into the optical signal having the wavelength band of 1540±5 nm. Further, the optical signal inputted from the second processing unit 200 is converted by the transponder 223 into the optical signal having the wavelength band of 1550±5 nm.

The optical switch 401 selectively outputs any one of the two optical signals inputted from the converting units 300 (the transponders 123 and 223) and having the wavelength bands which differ from each other. Herein, the optical switch 401 is switching-controlled to output the optical signal inputted via the first processing unit 100, and therefore outputs the optical signal (which is herein the optical signal having the wavelength band of 1540±5 nm) inputted via the first processing unit 100.

As shown in FIG. 2, the optical signals outputted from the optical switch 401 are supplied to a TDM device L2. Further, the optical signals outputted from the optical switch 401 branch off at photo couplers C4, C5 and travel toward the optical input monitors 404, 405. Since the band-pass filters #1, #2 have the characteristics given above, the optical signal (which is herein the optical signal having the wavelength band of 1540±5 nm) penetrates the band-pass filter #1 and reaches the optical input monitor 404. This optical signal, however, neither penetrates the band-pass filter #2 nor therefore reaches the optical input monitor 405.

Hence, the collation unit 406 judges, based on the electric signal inputted from each of the optical input monitors 404, 405, that the wavelength band of the optical signal actually outputted from the optical switch 401 is on the order of 1540±5 nm. Incidentally, it is possible to confirm from the optical input states to the optical input monitors 404, 405 that the optical signal from the first processing unit 100 is normally selected as the output of the optical switch 401.

The collation unit 406 compares information representing a result of the control over the optical switch 401 that is supplied from the control unit 407 with a result of the judgment. To be specific, the collation unit 406 compares the wavelength band (which is 1540±5 nm in this case) of the input optical signal that the control unit 407 tried to output under the switching-control of the optical switch 401 with the wavelength band of the judged optical signal. As a result of this comparison, if these two wavelength bands differ from each other, the collation unit 406 detects the abnormality of the optical switch 401 and notifies of this purport. Whereas if these two wavelength bands are coincident with each other, the collation unit 406 judges that the optical switch 401 is normal and therefore notifies of nothing particular.

For instance, the control unit 407 executes the switching-control of the optical switch 401 for the purpose of outputting the optical signal having the wavelength band of 1540±5 nm that is inputted via the first processing unit 100, and nevertheless, if the optical switch 401 outputs, due to its operational abnormality, the optical signal having the wavelength band of 1550±5 nm that is inputted via the second processing unit 200, there vanishes the optical input via the band-pass filter #1. In this case, the two wavelength bands being different, the collation unit 406 detects the abnormality of the optical switch 401 (or abnormality of the connection of the optical path) and notifies of this purport. With this operation thus done, it is possible to grasp the abnormality in the system before a trouble shift in a signal-transferable state by issuing an alarm to a maintenance man.

In the description of the embodiment, the converting units 300 are disposed adjacent to the output sides of the first and the second processing units 100, 200, however, the present invention is not limited to this layout. For example, the converting units 300 may also be disposed adjacent to the input side of the switch unit 401.

The present invention can be carried out in a variety of forms without deviating from the spirit and the principal features of the invention. Therefore, the embodiment is nothing but the simple exemplification in every aspect and should not be construed limitedly.

INDUSTRIAL APPLICABILITY

According to the present invention, it is possible to judge the optical signal outputted from the optical switch that selectively outputs any one of the input optical signals. It is therefore feasible to detect the abnormality of the optical switch or of the intermediate optical path. Further, the signal can be prevented from being cut off due to the erroneous system switching.

What is claimed is:

1. An optical signal judging system for judging an optical signal outputted from an optical switch which selectively outputs any one of input optical signals, comprising:
   a converting unit converting at least two optical signals branching off from an optical signal source into optical signals having wavelength bands differing from each other, and thus outputting the at least the two optical signals to said optical switch, wherein said optical switch outputs any one of the at least two optical signals so converted as to have the wavelength bands differing from each other, which have been inputted from said converting unit;
   a control unit selecting any one of the at least two optical signals and performing switching-control of said optical switch so that the selected optical signal is outputted;
   a filter unit including a first wavelength band filter having a fixed transmission wavelength band transmitting one of the at least two optical signals and a second wavelength band filter having a fixed transmission wavelength band transmitting the other of the at least two optical signals;
   a light receiving unit including a first light receiving device receiving the optical signal outputted from said optical switch and transmitted through said first wavelength band filter, and a second light receiving device receiving the optical signal outputted from said optical switch and transmitted through said second wavelength band filter;
   a judging unit checking the wavelength band of the optical signal selected by said control unit with a result of receiving the optical signal received by the first and the second light receiving devices, and judging the wavelength band of the optical signal outputted from said optical switch; and
   a detecting unit detecting abnormality of said optical switch when the optical signal to be outputted from the optical switch by the control unit is not received by any one of the first light receiving device and the second light receiving device.

2. An optical signal judging system for judging an optical signal outputted from an optical switch which selectively outputs any one of input optical signals, comprising:
   a converting unit converting into optical signals having wavelength bands differing from each other and thus outputting the at least two optical signals to said optical switch, at least two optical signals inputted respectively from a first processing unit executing a predetermined process upon one optical signal of the at least two optical signals branching off from an optical signal source and from a second processing unit executing the same process as the predetermined process upon the other optical signal of at least the two optical signals branching off said optical signal source, wherein said optical switch outputs any one of at least the two optical signals so converted as to have the wavelength bands differing from each other;
   a control unit selecting any one of the at least two optical signals and performing switching-control of said optical switch so that the selected optical signal is outputted,
   a filter unit including a first wavelength band filter having a fixed transmission wavelength band transmitting one of the at least two optical signals and a second wavelength band filter having a fixed transmission wavelength band transmitting the other of the at least two optical signals,
   a light receiving unit including a first light receiving device receiving the optical signal outputted from said optical switch and transmitted through said first wavelength band filter, and a second light receiving device receiving the optical signal outputted from said optical switch and transmitted through said second wavelength band filter,
   a judging unit checking the wavelength band of the optical signal selected by said control unit with a result of receiving the optical signal received by the first and the second light receiving devices, and judging the wavelength band of the optical signal outputted from said optical switch; and
   a detecting unit detecting abnormality of said optical switch when the optical signal to be outputted from the optical switch by the control unit is not received by any one of the first light receiving device and the second light receiving device.

3. An optical signal judging method for judging an optical signal outputted from an optical switch the selectively outputs any one of input optical signals, comprising:
   converting, into optical signals having wavelength bands differing from each other and thus outputting the optical signals to said optical switch, at least two optical signals inputted respectively from a first processing unit executing a predetermined process upon one optical signal of the at least two optical signals branching off from an optical signal source into optical signals source and from a second processing unit executing the same process as the predetermined process upon the other optical signal of the at least two optical signal source, wherein said optical switch outputs any one of at least the two optical signals so converted as to have the wavelength bands differing from each other;
   controlling selecting any one of the at least two optical signals and performing switching-control of said optical switch so that the selected optical signals is outputted,
   first receiving the optical signal outputted from said optical switch and transmitted through a first wavelength band filter having a fixed transmission wavelength band transmitting one of the at least two optical signals;
   second receiving the optical signal outputted from said optical switch and transmitted through a second wavelength band filter having a fixed transmission wavelength band transmitting the other of the at least two optical signals;
   checking the wavelength band of the optical signal selected by said controlling with a result of receiving the optical signal received by the first receiving and the second receiving, and judging the wavelength band outputted from said optical switch; and
   detecting any abnormality of said optical switch when the optical signal to be outputted from the optical switch by said controlling is not received by any one of the first receiving and the second receiving.

4. An optical signal judging method for judging an optical signal outputted from an optical switch the selectively outputs any one of input optical signals, comprising:

converting, into optical signals having wavelength bands differing from each other and thus outputting the optical signals to said optical switch, at least two optical signals inputted respectively from a first processing unit executing a predetermined process upon one optical signal of the at least two optical signals branching off from an optical signal source, wherein said optical switch outputs any one of at least the two optical signals so converted as to have the wavelength bands differing from each other;

controlling selecting any one of the at least two optical signals and performing switching-control of said optical switch so that the selected optical signals is outputted;

first receiving the optical signal outputted from said optical switch and transmitted through a first wavelength band filter having a fixed transmission wavelength band transmitting one of the at least two optical signals;

second receiving the optical signal outputted from said optical switch and transmitted through a second wavelength band filter having a fixed transmission wavelength band transmitting the other of the at least two optical signals;

checking the wavelength band of the optical signal selected by said control step with a result of receiving the optical signal received by the first receiving and the second receiving, and judging the wavelength band outputted from said optical switch; and detecting any abnormality of said optical switch when the optical signal to be outputted from the optical switch by said control step is not received by any one of the first receiving and the second receiving.

\* \* \* \* \*